(12) United States Patent
Bhattacharya et al.

(10) Patent No.: US 11,107,206 B2
(45) Date of Patent: Aug. 31, 2021

(54) TECHNIQUES FOR DETECTING SPATIAL ANOMALIES IN VIDEO CONTENT

(71) Applicant: NETFLIX, INC., Los Gatos, CA (US)

(72) Inventors: Subhabrata Bhattacharya, Campbell, CA (US); Adithya Prakash, Campbell, CA (US); Rohit Puri, Campbell, CA (US)

(73) Assignee: NETFLIX, INC., Los Gatos, CA (US)

( * ) Notice: Subject to any disclaimer, the term of this patent is extended or adjusted under 35 U.S.C. 154(b) by 175 days.

(21) Appl. No.: 16/143,386

(22) Filed: Sep. 26, 2018

(65) Prior Publication Data

US 2019/0114761 A1 Apr. 18, 2019

Related U.S. Application Data (60) Provisional application No. 62/573,617, filed on Oct. 17, 2017.

(51) Int. Cl.
*G06K 9/00* (2006.01)
*G06T 7/00* (2017.01)
(Continued)

(52) U.S. Cl.
CPC ........ *G06T 7/0002* (2013.01); *G06K 9/00744* (2013.01); *G06K 9/4604* (2013.01);
(Continued)

(58) Field of Classification Search
None
See application file for complete search history.

(56) References Cited

U.S. PATENT DOCUMENTS 4,532,650 A * 7/1985 Wihl .................. G03F 1/84
348/125
4,561,022 A * 12/1985 Bayer ................ H04N 1/409
348/622

(Continued)

FOREIGN PATENT DOCUMENTS

WO 01/26054 A2 4/2001

OTHER PUBLICATIONS

Wang, Xuewen, and Lixia Chen. "An effective histogram modification scheme for image contrast enhancement." Signal Processing: Image Communication 58 (2017): 187-198. (Year: 2017).*

(Continued)

*Primary Examiner* — Sean M Conner
(74) *Attorney, Agent, or Firm* — Artegis Law Group, LLP (57) ABSTRACT

In various embodiments, a defective pixel detection application automatically detects defective pixels in video content. In operation, the defective pixel detection application computes a first set of pixel intensity gradients based on a first frame of video content and a first neighborhood of pixels associated with a first pixel. The defective pixel detection application also computes a second set of pixel intensity gradients based on the first frame and a second neighborhood of pixels associated with the first pixel. Subsequently, the defective pixel detection application computes a statistical distance between the first set of pixel intensity gradients and the second set of pixel intensity gradients. The defective pixel detection application then determines that the first pixel is defective based on the statistical distance.

20 Claims, 4 Drawing Sheets

(51) Int. Cl.
*G06K 9/46* (2006.01)
*G06K 9/62* (2006.01)
*G06T 5/00* (2006.01)
*H04N 17/00* (2006.01)

(52) U.S. Cl.
CPC ......... *G06K 9/4647* (2013.01); *G06K 9/6215* (2013.01); *G06T 5/005* (2013.01); *G06K 2009/00583* (2013.01); *G06T 2207/10016* (2013.01); *G06T 2207/20072* (2013.01); *G06T 2207/30168* (2013.01); *H04N 17/00* (2013.01)

(56) References Cited

U.S. PATENT DOCUMENTS

| | | | | |
|---|---|---|---|---|
| 6,650,774 | B1 | 11/2003 | Szeliski | |
| 9,161,029 | B1* | 10/2015 | Kumar | H04N 17/02 |
| 2010/0073526 | A1* | 3/2010 | Watanabe | H04N 5/367 |
| | | | | 348/247 |
| 2013/0063556 | A1* | 3/2013 | Russell | G06T 7/269 |
| | | | | 348/42 |
| 2017/0180722 | A1* | 6/2017 | Manbeck | G06T 5/005 |
| 2017/0257584 | A1 | 9/2017 | Fujita | |

OTHER PUBLICATIONS

McLachlan, Goeffrey J. "Mahalanobis distance." Resonance 4.6 (1999): 20-26. (Year: 1999).*
International Search Report for application No. PCT/US2018/055956 dated Jan. 25, 2019.
Bhattacharya et al., "Shot Change and Stuck Pixel Detection of Digital Video Assets", Smpte Motion Imaging Journal, vol. 127, No. 6, Jul. 1, 2018, pp. 34-43.

* cited by examiner

TECHNIQUES FOR DETECTING SPATIAL ANOMALIES IN VIDEO CONTENT

CROSS-REFERENCE TO RELATED APPLICATIONS

This application claims the priority benefit of the U.S. Provisional Patent Application titled, "TECHNIQUES FOR DETECTING SPATIAL-PIXEL ANOMALIES" filed on Oct. 17, 2017 and having Ser. No. 62/573,617. The subject matter of this related application is hereby incorporated herein by reference.

BACKGROUND

Field of the Various Embodiments

Embodiments of the present invention relate generally to computer-aided quality control for video content and, more specifically, to techniques for detecting spatial anomalies in video content.

Description of the Related Art

Flaws in sensors used to acquire source video content associated with a media title typical result in defective pixels being generated in the source video content. For instance, if a charge-coupled device or complementary metal-oxide-semiconductor image sensor included in a video camera were unable to properly sense intensities, then the source video content could include a dead pixel or a stuck pixel. As used herein, a "dead pixel" is associated with a black color; whereas, a "stuck pixel" is associated with an invariant color. Visual anomalies resulting from such defective pixels (i.e., dead or stuck pixels) being included in source video content are oftentimes exacerbated by downstream transcoding operations that are used to translate the source video content into different versions of target video content that are tailored for a variety of different display devices. These visual anomalies can negatively impact the overall viewing experience. More specifically, during transcoding, each defective pixel can corrupt neighboring pixels, thereby creating multi-pixel regions of visual anomalies in the target video content. During playback of that target video content, the attention of a viewer may be diverted to those multi-pixel regions of visual anomalies, thereby degrading the viewing experience for that viewer.

In an effort to avoid scenarios like those described above, many video content distributors attempt to detect defective pixels included in source video content via post-production analyses. The video content distributors then perform remedial actions to mitigate or fix the defective pixels prior to generating the target video content. For example, a video content distributor could modify the intensities of a defective pixel based on the intensities of neighboring pixels and/or notify the provider of the source video content that the associated video camera is defective.

In one conventional approach for detecting defective pixels, a quality control person plays back source video content multiple times and attempts to manually identify any defective pixels included in the source video content. In a typical setup, the quality control person views the source video content from beginning to end repeatedly on a large, high-resolution display in a very dark room. During the repeated viewings, the quality control person scrutinizes the display in an attempt to manually identify any visual anomalies.

One drawback of the above approach to detecting defective pixels is that viewing and analyzing source video content multiple times over is time-consuming and labor intensive. For example, if the source video content makes up a typical feature film "A" having a playback duration of 110 minutes, and the quality control person were to view the entire film "A" six times, then the quality control person would spend 11 hours viewing the source video content Further, manually identifying defective pixels is extremely difficult and error-prone. For example, if the quality control person were to view the film "A" on a 4K television, and the film "A" has 158,400 frames, then the quality control person would have to scrutinize over eight million pixels during each of 158,400 different frames. As a result, the quality control person likely would overlook at least some defective pixels.

Certain conventional quality control tools exist that may be used to reduce the manual effort required to detect defective pixels. However, these types of quality control tools are error-prone and usually require manual intervention in order to finalize the results. In particular, a typical quality control tool usually erroneously identifies many non-defective pixels as defective. A quality control person then needs to manually review each of the identified "defective" pixels to determine which of the pixels are actually defective. Even with manual intervention, a finalized list of defective pixels may omit some defective pixels and include some non-defective pixels.

As the foregoing illustrates, what is needed in the art are more effective techniques for detecting defective pixels in source video content.

SUMMARY

One embodiment of the present invention sets forth a computer-implemented method for detecting defective pixels in video content. The method includes computing a first plurality of pixel intensity gradients based on a first frame of video content and a first neighborhood of pixels associated with a first pixel; computing a second plurality of pixel intensity gradients based on the first frame and a second neighborhood of pixels associated with the first pixel; computing a first statistical distance between the first plurality of pixel intensity gradients and the second plurality of pixel intensity gradients; and determining that the first pixel is defective based on the first statistical distance.

At least one technical advantage of the disclosed techniques relative to the prior art is that, with the disclosed techniques, both the time and the amount of manual effort required to detect defective pixels in video content is reduced. In particular, the disclosed techniques automatically detect defective pixels in a high-throughput fashion using a distributed execution framework. In addition, the disclosed techniques implement high-level statistics-based spatial filtering and temporal consistency filtering to increase the accuracy of detection relative to prior art solutions. These technical advantages provide one or more technological advancements over the prior art.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

The overall visual experience that a video streaming service provides to customers depends on the degree to which source video content enables accurate playback of an associated media title. However, flaws in sensors used to acquire the source video content can result in defective pixels being generated in the source video content. The defective pixels are oftentimes associated with visual anomalies that can negatively impact the overall viewing experience. For example, during playback of a media title, a dead pixel in the source video content could appear as a black speck in a blue lake. Therefore, being able to detect and mitigate defective pixels in source video content is an important factor in the ability of the video streaming service to provide high-quality viewing experiences to customers.

Prior art techniques for detecting defective pixels are labor-intensive, prohibitively time-consuming, and/or not necessarily reliable. For instance, in one prior art technique, a quality control person views a media title from beginning to end repeatedly under controlled viewing conditions. During the repeated viewings, the quality control person scrutinizes the display in an attempt to manually identify any visual anomalies. If the video streaming service were to provide access to 1,000 media titles having an average playback duration of 110 minutes, and quality control people were to view each media title 6 times, then the total number of person-hours required to screen the media titles for defective pixels would be 11,000 hours—over 15 person-months. Further, manually identifying defective pixels within the millions of pixels that would typically be displayed at any given time during each viewing is prohibitively difficult. Consequently, the quality control people likely would overlook at least some defective pixels. Other prior-art techniques involve using quality control tools to automatically detect defective pixels. However, these type of quality control tools are error-prone and usually require manual intervention to determine which of the automatically detected "defective" pixels are actually defective.

With the disclosed techniques, however, a video streaming service can automatically and reliably generate a list of defective pixels included in source video content, where the list is ranked by candidate frequencies across the source video content. The "candidate frequency" for a given pixel correlates to a total number of frames in which the pixel exhibits the types of visual defects typically associated with defective pixels. The video streaming service can then modify the defective pixels to more closely match neighboring pixels and/or inform the provider of the source video content that the video camera that acquired the source video content is defective.

In various embodiments, a defective pixel detection application uses distributed execution techniques, outlier detection techniques, and filtering techniques to efficiently and reliably detect defective pixels in source video content. First, the defective pixel detection application partitions the source video content into multiple, equal-sized clips. For each clip, the defective pixel detection application uses cloud resources to concurrently generate a different candidate frequency table. To generate the candidate frequency table for a given clip, the defective pixel detection application identifies potentially defective pixels for each frame. More specifically, for each frame, the defective pixel detection application performs locally adaptive contrast enhancement operations to improve the contrast of any defective pixels. The defective pixel application then executes outlier detection algorithms on the resulting enhanced frame to generate an initial candidate list of potentially defective pixels.

For each enhanced frame, the defective pixel application executes high-level, statistics-based spatial filtering operations on the associated initial candidate list to generate an associated refined candidate list. During the spatial filtering operations, if the defective pixel detection application determines that a candidate pixel is associated with abrupt changes in intensity gradient that are characteristic of defective pixels, then the defective pixel detection application adds the candidate pixel to the refined candidate list. Otherwise, the defective pixel detection application omits the candidate pixel from the refined candidate list. The defective pixel detection application then computes a candidate frequency across the clip for each candidate pixel that appears in one or more of the refined candidate lists. If the candidate frequency associated with a particular candidate pixel exceeds a frequency threshold, then the defective pixel detection application adds the candidate pixel to the candidate frequency table. Otherwise, the defective pixel detection application omits the candidate pixel from the candidate frequency table. Finally, the defective pixel detection application consolidates the candidate frequency tables associated with the different clips to generate a defective pixel list ordered by decreasing overall candidate frequency across the video content.

At least one technical advantage of the disclosed techniques relative to prior art solutions is that, with the disclosed techniques, the defective pixel detection application more efficiently and reliably identifies defective pixels in the source video content. In particular, detecting defective pixels does not involve the labor-intensive and time-consuming activities associated with prior art techniques for detecting defective pixels. Further, by performing both spatial and temporal filtering operations based on an initial list of outliers, the disclosed techniques increase the accuracy of defective pixel detection relative to prior art solutions. These technical advantages provide one or more technological advancements over the prior art.

System Overview

Figure 1:
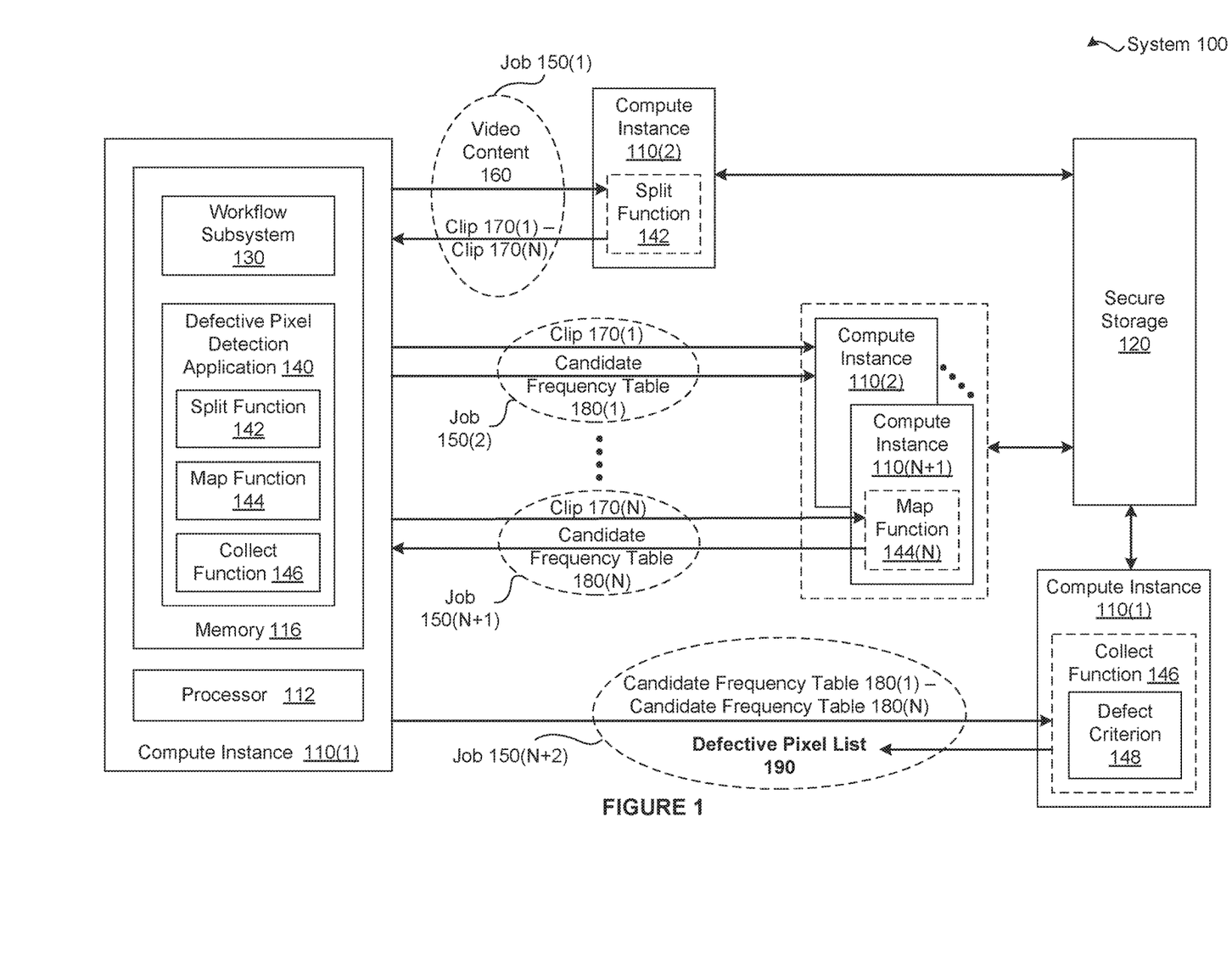
FIG. 1 is a conceptual illustration of a system configured to implement one or more aspects of the present invention.

FIG. 1 is a conceptual illustration of a system 100 configured to implement one or more aspects of the present invention. As shown, the system 100 includes, without limitation, a secure storage 120 and any number of compute instances 110. For explanatory purposes, multiple instances of like objects are denoted with reference numbers identifying the object and parenthetical numbers identifying the instance where needed. In various embodiments, any number of the components of the system 100 may be distributed across multiple geographic locations or implemented in one or more cloud computing environments (i.e., encapsulated shared resources, software, data, etc.) in any combination.

The secure storage 120 includes any amount and type of memory resources that are capable of securely storing data. For instance, in some embodiments, the secure storage 120 is managed by a secure storage subsystem and stores data in an encrypted form. In various embodiments, the secure storage 120 may be replaced by any type of storage that is implemented in any technically feasible fashion. For instance, the secure storage 120 could be replaced by any amount and type of cloud-based memory resources that store any amount and type of data in any form. In alternative embodiments, the system 100 may include any amount and type of secure storage 120.

As shown for the compute instance 110(1), each compute instance 110 includes, without limitation, a processor 112 and a memory 116. In alternative embodiments, each compute instance 110 may include any number of processors 112 and any number of memories 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112 of the compute instance 110.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

Each compute instance 110 is configured to implement one or more applications or subsystems of applications. For explanatory purposes only, each application is depicted as residing in the memory 116 of a single compute instance 110 and executing on a processor 112 of the single compute instance 110. However, as persons skilled in the art will recognize, the functionality of each application may be distributed across any number of other applications that reside in the memories 116 of any number of compute instances 110 and execute on the processors 112 of any number of compute instances 110 in any combination. Further, the functionality of any number of applications or subsystems may be consolidated into a single application or subsystem.

In particular, the compute instance 110(1) enables the system 100 to detect defective pixels in video content 160 in a high-throughput fashion. The video content 160 may be in any video format and includes, without limitation, any number of frames. Each frame includes, without limitation, any number of pixels. Each pixel is associated with a physical location relative to the other pixels and is characterized by an intensity that can differ between frames. The intensity includes, without limitation, three channel values, where each channel value is associated with a different channel of an RGB color space. In alternative embodiments, each pixel may be associated with any number of channels and include any number of channel values. Further, the number of channel values may vary based on the channel. In the same or other alternative embodiments, the video content 160 may be represented in any color space and the techniques described herein are modified accordingly. Examples of other color spaces include, without limitation, YCbCr, Y'CbCr, YUV, YIQ, YPbPr, and ICtCp, to name a few.

In general, the video content 160 is associated with a media title (not shown). Some examples of media titles include, without limitation, a feature-length movie, an episode of a television show, and a television advertisement. As referred to herein, a "defective pixel" in the video content 160 is caused by a flawed sensor included in a video camera during the process of acquiring the video content 160. A flawed sensor is unable to properly sense intensities. For example, a flawed sensor that is unable to sense any intensities results in a dead pixel being included in the video content 160, whereas a flawed sensor that is unable to sense blue or green intensities results in a red "stuck pixel" being included in the video content 160.

The video content 160 may be source video content that is acquired directly by video cameras or target video content derived from source video content. Oftentimes, target video content is generated from source video content during downstream transcoding operations that are used to translate the source video content into different versions of target video content that are tailored for a variety of different display devices. Notably, visual anomalies resulting from defective pixels being included in source video content are oftentimes exacerbated in a domino fashion by the transcoding operations More specifically, during transcoding, each defective pixel can corrupt neighboring pixels, creating multi-pixel regions of visual anomalies in the target video content. During playback of that target video content, the attention of a viewer may be diverted to those multi-pixel regions of visual anomalies, thereby degrading the viewing experience for that viewer.

In an effort to avoid scenarios like those described above, many video content distributors attempt to detect defective pixels included in the video content 160 to guide remedial actions. For example, a video streaming service could attempt to detect defective pixels included in the source video content for a media title. The video streaming service could then modify the intensities of a defective pixel based on the intensities of neighboring pixels and/or notify the provider of the source video content that the associated video camera is defective. Subsequently, the video streaming service could perform transcoding operations to generate target video content in a variety of different formats targeting different display devices. By correcting the pixels that are identified as defective prior to performing the transcoding operations, the video streaming service would mitigate the domino effect described above.

Conventional approaches to detecting defective pixels in video content are labor-intensive, prohibitively time-consuming, and/or not necessarily reliable. For instance, in some conventional approaches to detecting defective pixels, a quality control person scrutinizes a high definition display for visual anomalies while viewing source video content from beginning to end repeatedly under controlled viewing conditions. Because manually monitoring pixels over the length of a media title is prohibitively difficult, the quality control person would likely overlook at least some defective pixels. Other conventional approaches to detecting defective pixels involve using quality control tools to detect defective pixels. One drawback of these type of quality control tools is that the quality control tools typically misidentify many non-defective pixels as defective and, consequently, require manual intervention to determine which of the identified "defective" pixels are actually defective.

Automatically Detecting Defective Pixels

To address the above problems, the system 100 includes, without limitation, a defective pixel detection application 140 that automatically and reliably detects defective pixels in the media content 160 based on intensity patterns that typically characterize defective pixels. The defective pixel detection application 140 resides in the memory 116 of the compute instance 110(1) and executes on any number of processors 112 included in any number of the compute instances 110 in a distributed execution fashion. In alternative embodiments, the defective pixel detection application 140 may execute in any technically feasible fashion on any number of processors 112 (including one).

As shown, the defective pixel detection application 140 includes, without limitation, a split function 142, a map function 144, and a collection function 146. The split function 142, the map function 144, and the collection function 146 execute via a split-map-collect workflow provided by a workflow subsystem 130. The workflow subsystem 130 is a distributed execution framework that enables concurrent processing of the video content 160. The workflow subsystem 110 resides in the memory 116 of the compute instance 110(1) and executes on the processor 112 of the compute instance 110(1). In alternative embodiments, the defective pixel detection application 140 may include any number and type of functions and may implement any number and type of distributed execution and/or concurrent processing techniques in any technically feasible fashion. In various embodiments, the system 100 may omit the workflow subsystem 130.

For explanatory purposes only, a single instance of the split function 142 is depicted as executing on the compute instance 110(2), N instances of the map function 144 are depicted as executing on N compute instances 110(2)-110 (N+1), and a single instance of the collect function 146 is depicted as executing on the compute instance 110(2). In alternative embodiments, the instance of the split function 142, the instances of the map function 144, and the instance of the collect function 146 may execute on any number of compute instances 110 in any combination and in any technically feasible fashion.

Upon receiving the video content 160, the workflow system 130 generates a job 150(1) that executes the split function 142 on the video content 160. The split function 142 partitions the video content 160 into clips 170(1)-170 (N). The split function 142 may partition the video content 160 into any number of the clips 170 in any technically feasible fashion. For example, the split function 142 could partition 158,400 frames included in the video content 160 based on a clip size of 100 frames to generate the clips 170(1)-170(1,584), where each of the clips 170 includes a different set of 100 contiguous frames.

After the job 150(1) finishes executing, the workflow subsystem 130 generates the jobs 150(2)-150(N), where N is the number of the clips 170. The job 150 (x+1) executes an instance of the map function 144(x) based on the clip 170(x) to generate a candidate frequency table 180(x). The map functions 144(1)-144(N) may generate the candidate frequency tables 180(1)-180(N) concurrently, sequentially, or in any combination thereof based on the available resources. To generate the candidate frequency table 180(x), the map function 144(x) first performs per-frame operations (not shown in FIG. 1) independently for each of the frames included in the clip 170(x).

For a given frame, the map function 144(x) performs locally adaptive contrast enhancement to amplify or suppress discontinuities in intensities of anomalous pixels to generate an enhanced frame. Subsequently, the map function 144(x) generates an initial candidate list based on local intensity gradients associated with the enhanced frame. The initial candidate list includes, without limitation, any number of candidates. As referred to herein, a "candidate" specifies a potentially defective pixel. Advantageously, the number of candidates included in the initial candidate list is typically orders of magnitude less than the total number of pixels associated with the video content 160.

Subsequently, the map function 144(x) performs spatial filtering operations on the initial candidate list to generate a refined candidate list. More precisely, for each of the initial candidates, the map function 144 computes a statistical distance between a distribution of first degree intensity gradients and a distribution of second degree intensity gradients. If the statistical difference exceeds a distance threshold, then the map function 144 determines that the initial candidate is associated with patterns characteristic of defective pixels and adds the initial candidate to the refined candidate list. Otherwise, the map function 144 omits the initial candidate from the refined candidate list.

After the map function 144(x) computes the different refined candidate lists associated with the different frames included in the clip 170(x), the map function 144(x) generates the candidate frequency table 180(x) based on a temporal consistency criterion (not shown in FIG. 1). The candidate frequency table 180(x) includes, without limitation, any amount and type of information associated with any number of per-clip candidates. The map function 144(x) may acquire and implement the temporal consistency criterion in any technically feasible fashion.

For instance, in some embodiments, the temporal consistency criterion is a minimum number of frames F that is specified via a graphical user interface (GUI). For each candidate included in any of the refined candidate lists, the map function 144(x) computes the candidate frequency across the clip 170(x). As referred to herein, the candidate frequency across the clip 170(x) is the total number of refined candidate lists associated with the clip 170(x) in which the candidate appears. If the candidate frequency across the clip 170(x) is greater than F, then the map function 144(x) adds the candidate to the candidate frequency table 180(x). Otherwise, the map function 144(x) omits the candidate from the candidate frequency table 180(x). In this fashion, the map function 144(x) filters out the candidates that are associated with temporally spurious visual anomalies. The map function 144 is described in greater detail below in conjunction with FIGS. 2 and 3.

After the jobs 150(2)-150(N+2) finish executing, the workflow subsystem 130 generates the job 150(N+2) that executes the collect function 146 based on the candidate frequency tables 180(1)-180(N). More precisely, the collect function 146 evaluates the candidate frequency tables 180 (1)-180(N) with respect to a defect criterion 148 to generate a defective pixel list 190. The defective pixel list 190 includes, without limitation, any amount and type of information associated with defective pixels. The collect function 146 may acquire and implement the defect criterion 148 in any technically feasible fashion. Further, the collect function 146 may perform any number of evaluation operations based on the candidate frequency tables 180(1)-180(N) to determine the defective pixels. Some examples of evaluation operations include, without limitation, comparison operations and ranking operations.

For instance, in some embodiments, the defect criterion 148 is a maximum number "D" of pixels to include in the defective pixel list 190. For each candidate, the collect function 146 computes an overall candidate frequency across the video content 160 based on the candidate frequency tables 180(1)-180(N). The collect function 146 then ranks the candidates in an order of decreasing overall candidate frequency. Finally, the collect function 146 generates the defective pixel list 190 that includes, without limitation, the D candidates having the highest candidate frequencies. If less than D candidates have an overall candidate frequency greater than 0, then the defective pixel list 190 includes less than D pixels.

In other embodiments, the defect criterion 148 is a frequency threshold specifying a minimum number "F" of frames across the video content 160. F is the minimum number of frames in which a candidate occurs before the candidate is to be categorized as a defective pixel. For each candidate, the collect function 146 computes the overall candidate frequency across the video content 160 and compares the overall candidate frequency to the frequency threshold. If the overall candidate frequency exceeds the frequency threshold, then the collect function 146 adds the candidate to the defective pixel list 190 as a defective pixel. Otherwise, the collect function omits the candidate from the defective pixel list 190. In the same or other embodiments, the collect function 146 may rank the defective pixels included in the defective pixel list 190 based on the overall candidate frequencies and/or include the overall candidate frequencies in the defective pixel list 190.

Note that the techniques described herein are illustrative rather than restrictive, and may be altered without departing from the broader spirit and scope of the invention. Many modifications and variations will be apparent to those of ordinary skill in the art without departing from the scope and spirit of the described embodiments and techniques. As a general matter, the techniques outlined herein are applicable to detecting defective pixels in video content based on a statistical distance between two distributions of pixel intensity gradients.

For instance, as persons skilled in the art will recognize, the intensity of a given pixel may vary across the frames of the video content 160. In particular, during transcoding operations, defective pixels may alter the intensities of neighboring pixels in a manner that varies over time. For this reason, in alternative embodiments, the map function 144 may generate the candidate frequency table 180 at a color-level of granularity instead of a pixel-level of granularity. In the same or other embodiments, the collect function 146 may generate the defective pixel list 190 at the color-level of granularity instead of a pixel-level of granularity. As referred to herein, at a "pixel-level" granularity, two items are distinguished based on an (x, y) coordinate associated with the video content 160. By contrast, at a "color-level," two items are distinguished based on a combination of an intensity range and an (x, y) coordinate associated with the video content 160.

For example, the map function 144 could determine that the pixel-level candidate P at the (x, y) coordinates of (345, 111) is associated with a primarily red intensity range from frame 20 to frame 60 and associated with a primarily green intensity range from frame 143 to frame 184. The map function 144 would add two color-level candidates associated with the pixel-level candidate P to the candidate frequency table 180(x). The first color-level candidate would be associated with the red intensity range and the (x, y) coordinates of (345, 111). The second candidate would be associated with the green intensity range and the (x, y) coordinates of (345, 111n. Subsequently, the collect function 146 could determine that both the first color-level candidate and the second color-level candidate satisfy the defect criterion 146. The collect function 146 would then add both the first color-level candidate and the second color-level candidate to the defective pixel list 190. Advantageously, providing additional information regarding the intensity ranges for which a pixel is defective facilitates subsequent remedial actions.

Figure 2:
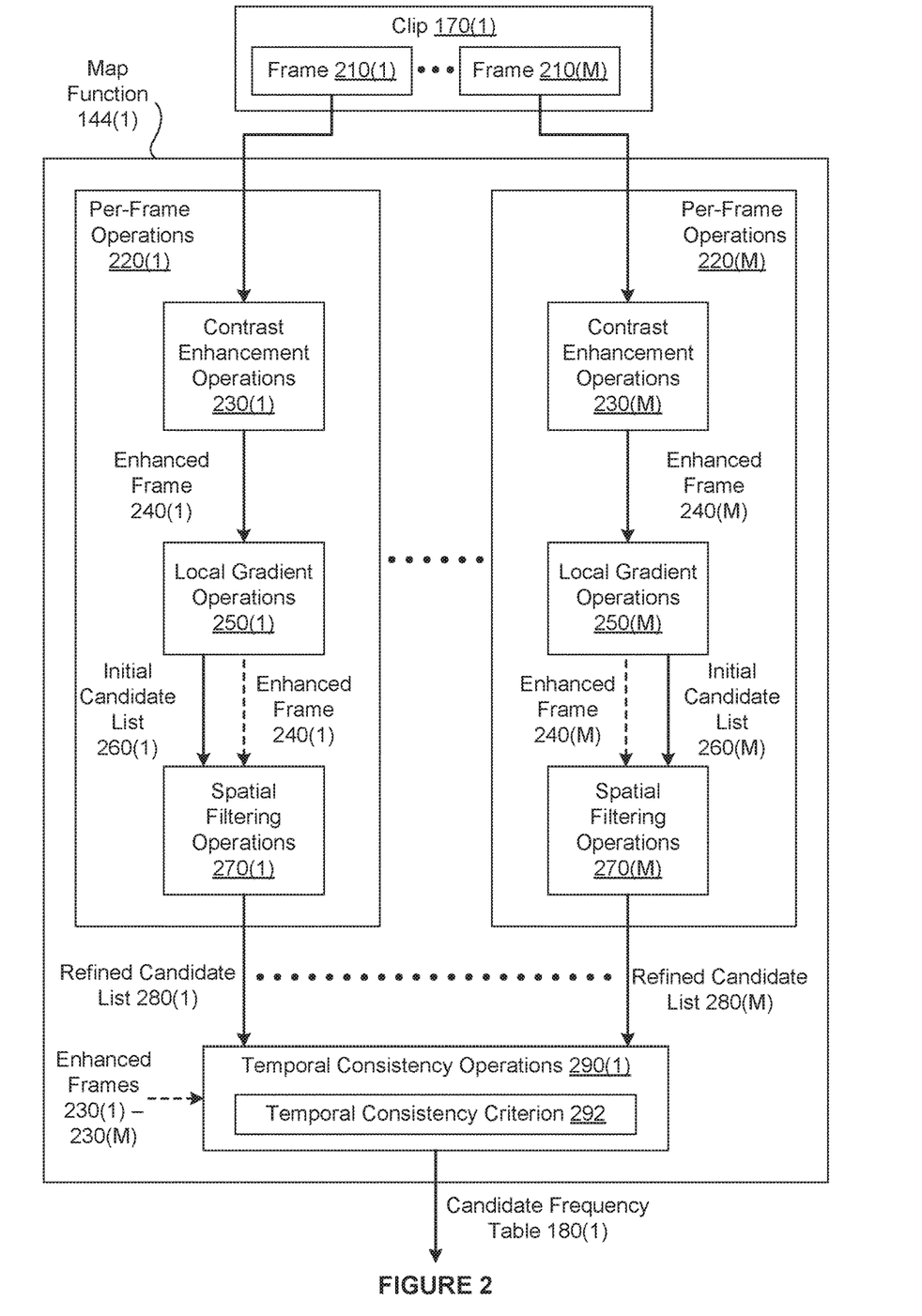
FIG. 2 is a more detailed illustration of the map function of FIG. 1, according to various embodiments of the present invention.

FIG. 2 is a more detailed illustration of the map function 144(1) of FIG. 1, according to various embodiments of the present invention. As shown, the map function 144(1) generates the candidate frequency table 180(1) based on the clip 170(1). The clip 170(1) includes, without limitation, any number of frames 210(1)-210(M). The map function 144(1) includes, without limitation, M different sets of per-frame operations 220(1)-220(M) and a set of temporal consistency operations 290(1). The map function 144(1) may perform the per-frame operations 220(1)-220(M) concurrently, sequentially, or in any combination thereof using any number and type of resources. For instance, in some embodiments, the map function 144(1) performs the per-frame operations 220 via cloud-based resources. The map function 144(1) performs the temporal consistency operations 290(1) after the sets of per-frame operations 220(1)-220(M) have finished executing.

As shown, each set of per-frame operations 220(x) includes, without limitation, contrast enhancement operations 230(x), local gradient operations 250(x), and spatial filtering operations 270(x). The contrast enhancement operations 230(x) generate an enhanced frame 240(x) based on the frame 210(x). To perform the contrast enhancement operations 230(x), the map function 144(1) applies a patch-based adaptive histogram equalization algorithm to the frame 210(x). The patch-based adaptive histogram equalization algorithm operates on different small regions of the frame 210(x) or "patches" to generate output patches included in the enhanced frame 240(x). The histogram of each output patch approximately matches a histogram specified by a distribution parameter that is fine-tuned to selectively amplify spatially local signals emanating from defective pixels. In this fashion, the contrast enhancement operations 230(x) enhance the intensities of defective pixels relative to the neighboring pixels.

In general, the contrast enhancement operations 230(x) enhance the discriminative properties of the frame 210(x) with respect to defective pixels. Consequently, the accuracy of detection operations performed on the enhanced frame 240(x) is increased relative to the accuracy of detection operations performed on the frame 210(x). In alternative embodiments, the map function 144 may perform any number and type of technically feasible operations to enhance the discriminative properties of the frames 210 with respect to defective pixels.

The local gradient operations 250(x) generate an initial candidate list 260(x) based on the enhanced frame 240(x). The initial candidate list 260(x) includes, without limitation, any amount and type of information associated with any number of candidates, where each candidate is associated with a potentially defective pixel. For instance, in some embodiments, the initial candidate list 260(x) includes, without limitation, an ordered list of (x, y) coordinates in the enhanced frame 240(x). To perform the local gradient operations 250(x), the map function 144(1) applies Hessian and Harris corner detection algorithms to identify outliers included in the enhanced frame 240(x). The map function 144(1) then adds the outliers to the initial candidate list 260(i). Advantageously, the number of candidates included in the initial candidate list 260(x) is typically orders of magnitude less than the number of pixels included in the enhanced frame 240(x). In alternative embodiments, the map function 144 may perform any number and type of technically feasible operations to generate the initial candidate lists 260.

The spatial filtering operations 270(x) generate a refined candidate list 280(x) based on the initial candidate list 260(x) and the enhanced frame 240(x). The refined candidate list 280(x) includes, without limitation, any amount and type of information associated with any number of candidates. To generate the refined candidate list 280(x), the map function 144(1) performs high-level statistics based spatial filtering on the initial candidate list 260(x) to identify which candidates may actually be defective based on intensity patterns typically associated with defective pixels.

More precisely, for each candidate included in the initial candidate list 260(x), the map function 144(1) computes a first degree gradient matrix and a second degree gradient matrix associated with, respectively, a 3-by-3 neighborhood and a 5-by-5 neighborhood. The map function 144(1) then computes a Mahalanobis distance between the first degree gradient matrix and the second degree gradient matrix. If the Mahalanobis distance is greater than a distance threshold, then the map function 144(1) adds the candidate to the refined candidate list 280(x). Otherwise, the map function 144(1) omits the candidate from the refined candidate list 280(x). The spatial filtering operations 270 are described in greater detail below in conjunction with FIG. 3. In alternative embodiments, the map function 144 may compute any type of statistical distance between any two distributions of gradients to generate the refined candidate list 280(x).

After the map function 144(1) generates the refined candidate lists 280(1)-280M), the map function 144(1) performs the temporal consistency operations 290(1). The temporal consistency operations 290(1) generate the candidate frequency table 180(1) based on the refined candidate lists 280(1)-280M), the enhanced frames 230(1)-230(M), and a temporal consistency criterion 292. The candidate frequency table 180(1) includes, without limitation, any amount and type of information associated with any number of candidates associated with the clip 170(1). The map function 144 may acquire and implement the temporal consistency criterion 292 in any technically feasible fashion.

For instance, in some embodiments, the temporal consistency criterion 292 is a temporal threshold that the map function 144(1) acquires via a GUI. The temporal threshold specifies a minimum number of F frames in which a candidate is identified before the candidate is to be classified as a defective pixel. For each candidate that is included in at least one of the refined candidate lists 280(1)-280(M), the map function 144(1) computes the candidate frequency across the clip 170(1). The candidate frequency across the clip 170(1) is the total number of the refined candidate lists 280(1)-280(M) in which the candidate appears. If the candidate frequency across the clip 170(x) is greater than F, then the map function 144(x) adds the candidate to the candidate frequency table 180(x). Otherwise, the map function 144(x) omits the candidate from the candidate frequency table 180(x). In this fashion, the map function 144(x) filters out the candidates that are associated with temporally spurious visual anomalies.

In various implements, the map function 144(1) computes and/or supplements the candidate frequency table 180(1) with any amount and type of additional information relevant to detecting and mitigating defective pixels. For instance, in some embodiments, as part of performing the temporal consistency operations 290, the map function 144(1) computes clip-level statistics for each defective pixel included in at least one of the refined candidate lists 280(1)-280(M). Examples of clip-level statistics include, without limitation, the mean intensity of the candidate and the mean intensity of a 5-by-5 neighborhood surrounding the candidate. The map function 144(1) may then add the clip-level statistics to the candidate frequency table 180(1) and/or perform additional operations based on the clip-level statistics. Subsequently, the collect function 146 may perform any number and type of operations and/or supplement the defective pixel list 190 based on the clip-level statistics.

In some alternative embodiments, the refined candidate lists 280(1)-280(M) include, without limitation, pixel-level candidates More specifically, each refined candidate list 280(i) specifies an ordered list of (x, y) coordinates within the frame 290(i). As described previously herein, the intensity of the pixel at a given (x, y) coordinates includes three channel values (R, G, and B). For each pixel-level candidate, the map function 144 computes any number of color-level candidate frequencies based on the refined candidate lists 280(1)-280M) and the ranges of the three channel values. More specifically, if the color of a given pixel-level candidate varies significantly across the frames 290 included in the clip 210(1), then the map function 144(1) computes multiple different color-level candidate frequencies. As referred to herein, a "color-level candidate" is potentially defective and is associated with (x, y) coordinates as well as an intensity range.

The map function 144(1) then performs filtering operations based on the color-level candidate frequencies and the temporal consistency criterion 292 to generate the candidate frequency table 180(1). For each unfiltered color-level candidate, the map function 144(1) adds candidate data associated with the color-level candidate to the candidate frequency table 180(1). The candidate data for a given color-level candidate includes, without limitation, the color-level candidate frequency, the (x, y) coordinates, and the intensity range. Subsequently, the collect function 146 generates the defective pixel list 190 at the color-level of granularity. More precisely, the collect function 145 computes overall color-level candidate frequencies and filters the color-level candidates based on the overall color-level candidate frequencies and the defect criterion 148. The collect function 145 then ranks the unfiltered color-level candidates based on the overall color-level candidate frequencies. In this fashion, the collect function 145 indicates which of the channels (R, G, B) associated with each defective pixel are defective. Advantageously, indicating the channels associated with defective pixels streamlines remedial activities.

Filtering Non-Defective Pixel Based on Intensity Gradients

Figure 3:
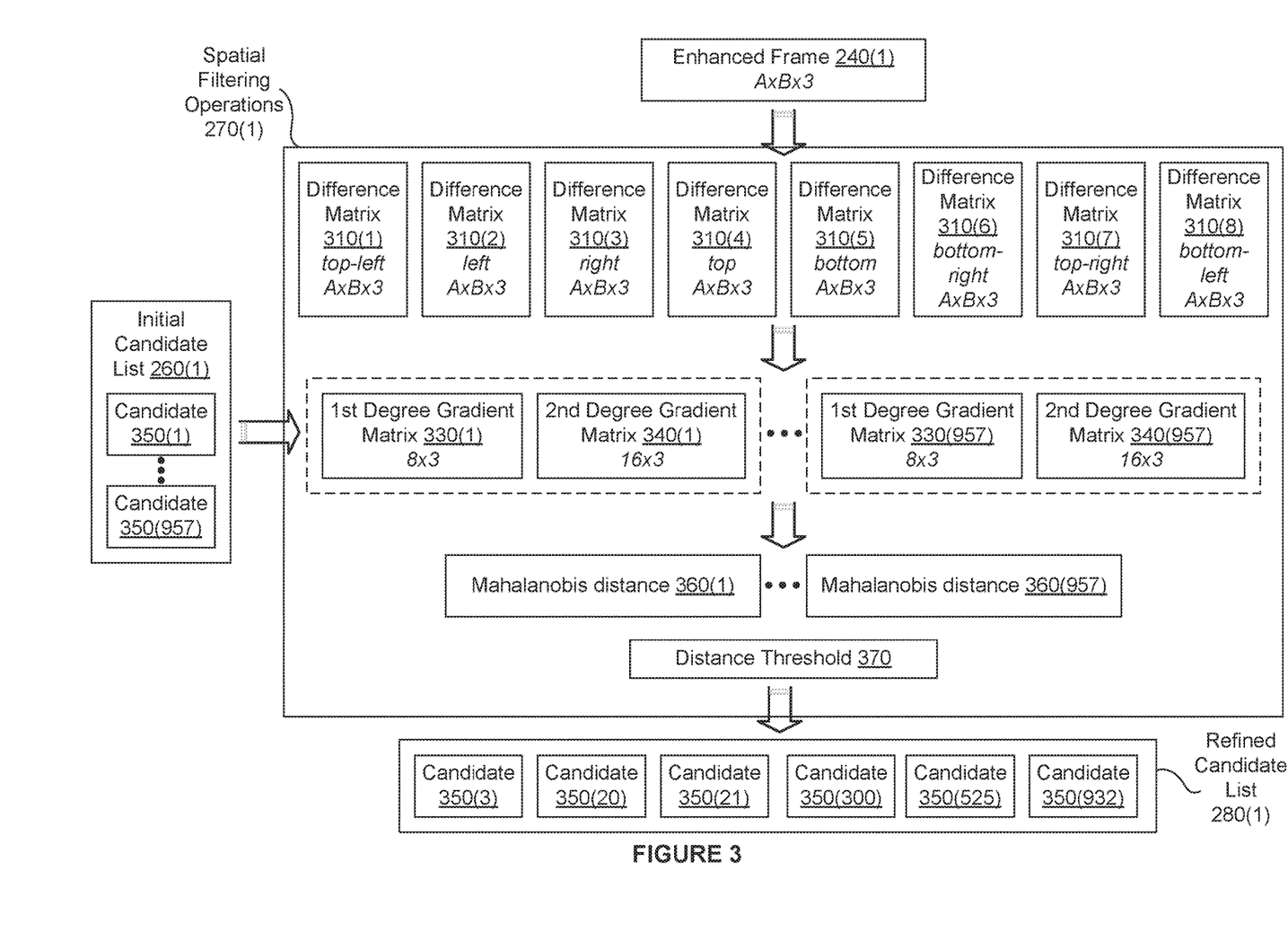
FIG. 3 is a more detailed illustration of the spatial filtering operations of FIG. 2, according to various embodiments of the present invention.

FIG. 3 is a more detailed illustration of the spatial filtering operations 270(1) of FIG. 2, according to various embodiments of the present invention. The map function 144(1) performs the spatial filtering operations 270(1) to generate the refined candidate list 280(1) based on the enhanced frame 240(1) and the initial candidate list 260(1). Both the frame 210(1) and the enhanced frame 240(1) have a height of A pixels, a width of B pixels, and 3 different channel values (red, green, and blue) for each pixel.

For explanatory purposes only, FIG. 3 describes the spatial filtering operations 270(1) at the pixel level of granularity. As shown, the initial candidate list 260(1) includes, without limitation, 957 candidates 350(1)-450 (957) at the pixel level of granularity. The refined candidate list 280(1) includes, without limitation, the 6 candidates 350(3), 350(20), 350(21), 350(300), 350(525), and 350(932) at the pixel level of granularity. In alternative embodiments, the map function 144(1) may perform the spatial filtering operations 270(1) at any level of granularity and may perform different operations at different levels of granularity. Further, the initial candidate list 260(1) may include any number of candidates 350 at any level of granularity and the refined candidate list 280(1) may include any number of candidates 250 at any level of granularity. In such embodiments, as outlined previously herein in conjunction with FIGS. 1 and 2, the techniques described herein may be modified accordingly.

As shown, the map function 144(1) generates eight difference matrices 310(1)-310-310(8) based on the enhanced frame 240(1). Each of the difference matrices 310 has the same size as the enhanced frame 240(1) but is associated with a different direction. The difference matrices 310(1)-310(8) are associated with, respectively, top-left, left, right, top, bottom, bottom-right, top-right, and bottom-left directions. To compute the difference matrices 310, the map function 144(1) pads the enhanced frame 240(1) to generate a padded matrix P[0:PA-1, 0:PB-1, 0:2]. (not shown in FIG. 1) having height PA=A+4, width PB=B+4, and 3 different channel values for each pixel The map function 144(1) may pad the enhanced frame 240(1) in any technically feasible fashion.

For instance, in some embodiments, the map function 144(1) adds two rows above, two rows below, two rows to the right of, and two rows to the left of the enhanced frame 240(1). The two topmost rows included in the padded frame are replicas of the top row included in the enhanced frame 240(1). The two bottom-most two rows included in the padded frame are replicas of the bottom row included in the enhanced frame 240(1). The two rightmost columns included in the padded frame are replicas of the rightmost column included in the enhanced frame 240(1). The two leftmost columns included in the padded frame are replicas of the leftmost column included in the enhanced frame 240(1). To compute the additional corner entries included in the padded frame based, the map function 144(1) performs averaging operations on any number of the neighboring entries in the padded frame.

To compute the difference matrices 310(d), the map function 310 first computes a frame matrix based on the padded matrix. The frame matrix is the sub-matrix P[1:PA-1, 1:PB-1, 0:2], where the ranges 1:PA-1, 1:PB-1, and 0:2 are inclusive. As persons skilled in the art will recognize, the frame matrix is a matrix representation of the frame 240(1). Subsequently, to compute the difference matrix 310(d), the map function 144(1) determines an A×B×3 "offset" sub-matrix included in the padded matrix based on the direction associated with the difference matrix 310(d). Each offset sub-matrix is also referred to herein as an offset matrix. The map function 144(1) then subtracts the offset sub-matrix from the frame matrix to generate the difference matrix 310(d).

For instance, in some embodiments, to compute the difference matrix 310(1) $c_{tl}$ associated with the direction of top-left, the map function 144(1) sets the offset sub-matrix equal to P[0:PA-2, 0:PB-2, 0:2]. To compute the difference matrix 310(2) $c_{tl}$ associated with the direction of left, the map function 144(1) sets the offset sub-matrix equal to P[1:PA-1, 0:PB-2, 0:2]. To compute the difference matrix 310(3) $c_r$ associated with the direction of right, the map function 144(1) sets the offset sub-matrix equal to P[1:PA-1, 2:PB, 0:2]. To compute the difference matrix 310(4) $c_t$ associated with the direction of top, the map function 144(1) sets the offset sub-matrix equal to P[0:PA-2, 1:PB-1, 0:2]. To compute the difference matrix 310(5) $c_b$ associated with the direction of bottom, the map function 144(1) sets the offset sub-matrix equal to P[2:PA, 1:PB-1, 0:2]. To compute the difference matrix 310(6) $c_{br}$ associated with the direction of bottom-right, the map function 144(1) sets the offset sub-matrix equal to P[2:PA, 2:PB, 0:2]. To compute the difference matrix 310(7) $c_{tr}$ associated with the direction of top-right, the map function 144(1) sets the offset sub-matrix equal to P[0:PA-2, 2:PB, 0:2]. And, to compute the difference matrix 310(8) $c_{bl}$ associated with the direction of bottom-left, the map function 144(1) sets the offset sub-matrix equal to P[2:PA, 0:PB-2, 0:2]. Advantageously, as persons skilled in the art will recognize, computing the difference matrices 310 efficiently computes the intensity gradients along the different directions.

Subsequently, for each of the candidates 350(i) included in the initial candidate list 260(1), the map function 144(1) computes a first ($1^{st}$) degree gradient matrix (S) 330(i) and a second ($2^{nd}$) degree gradient matrix (T) 340(i) based on the difference matrices 310. The first degree gradient matrices 330 and the second degree gradient matrices 340 are also referred to herein as, respectively, the first order derivative matrices and the second order derivative matrices. In general, the entries in the first degree gradient matrix 330(i) specify the first degree local gradients in a 3×3 spatial neighborhood around the candidate 350(i). The first degree gradient matrix 330(i) has dimensions of 8×3, where the columns signify the gradients along the three channels R, G, and B. By contrast, the entries in the second degree gradient matrix 340(i) specify the second degree local gradients in a 5×5 spatial neighborhood around the candidate 350(i). The second degree gradient matrix 340(i) has dimensions of 20×3, where the columns signify the gradients along the three channels R, G, and B.

The map function 144(1) may compute the first degree gradient matrix 330(i) and the second degree gradient matrix 340(i) in any technically feasible fashion. For instance, in some embodiments, the map function 144(1) generates the first degree gradient matrix (S) 330(i) for the candidate 350(i) at the coordinates (x, y) based on the following equation (1):

$$S = \begin{bmatrix} c_{tl}[y+1, x+1, 0], & c_{tl}[y+1, x+1, 1], & c_{tl}[y+1, x+1, 2] \\ c_l[y+1, x+1, 0], & c_l[y+1, x+1, 1], & c_l[y+1, x+1, 2] \\ c_{bl}[y+1, x+1, 0], & c_{bl}[y+1, x+1, 1], & c_{bl}[y+1, x+1, 2] \\ c_b[y+1, x+1, 0], & c_b[y+1, x+1, 1], & c_b[y+1, x+1, 2] \\ c_{br}[y+1, x+1, 0], & c_{br}[y+1, x+1, 1], & c_{br}[y+1, x+1, 2] \\ c_r[y+1, x+1, 0], & c_r[y+1, x+1, 1], & c_r[y+1, x+1, 2] \\ c_{tr}[y+1, x+1, 0], & c_{tr}[y+1, x+1, 1], & c_{tr}[y+1, x+1, 2] \\ c_t[y+1, x+1, 0], & c_t[y+1, x+1, 1], & c_t[y+1, x+1, 2] \end{bmatrix} \quad (1)$$

And the map function 144(1) generates the second degree gradient matrix (T) 340(i) for the candidate 350(i) at the coordinates (x, y) based on the following equation (2):

$$T = \begin{bmatrix} c_{br}[y-1, x-1, 0], & c_{br}[y-1, x-1, 1], & c_{br}[y-1, x-1, 2] \\ c_r[y:y+3, x+1, 0], & c_r[y:y+3, x+1, 1], & c_r[y:y+3, x+1, 2] \\ c_{tr}[y+3, x-1, 0], & c_{tr}[y+3, x-1, 1], & c_{tr}[y+3, x-1, 2] \\ c_t[y+3, x:x+3, 0], & c_t[y+3, x:x+3, 1], & c_t[y+3, x:x+3, 2] \\ c_{tl}[y+3, x+3, 0], & c_{tl}[y+3, x+3, 1], & c_{tl}[y+3, x+3, 2] \\ c_l[y:y+3, x+3, 0], & c_l[y:y+3, x+3, 1], & c_l[y:y+3, x+3, 2] \\ c_{bl}[y-1, x+3, 0], & c_{bl}[y-1, x+3, 1], & c_{bl}[y-1, x+3, 2] \\ c_b[y-1, x:x+3, 0], & c_b[y-1, x:x+3, 1], & c_b[y-1, x:x+3, 2] \end{bmatrix} \quad (2)$$

The first degree gradient matrix 330(i) and the second degree gradient matrix 340(i) provide insight into whether the candidate 350(i) is associated with visually anomalous patterns that typically characterize defective pixels. An example of such a pattern is an abrupt change in intensity gradient that is typically observed in association with a dead pixel. In operation, the map function 144(1) computes a statistical difference between the first degree gradient matrix 330(i) and the second degree gradient matrix 340(i). The map function 144(1) then compares the statistical distance to a distance threshold 370 to determine whether to continue to re-classify the candidate 350(i) as non-defective. The map function 144 may compute any statistical difference and apply any distance-related filtering criterion instead of the distance threshold 370 in any technically feasible fashion.

For instance, in some embodiments, the map function 144(1) computes a Mahalanobis distance 360(i) based on the first degree gradient matrix 330(i) and the second degree gradient matrix 340(i). First, the map function 144(1) computes a 3×3 covariance matrix (C) based on the second degree gradient matrix 340(i). The covariance matrix captures the variance across multiple channels (e.g., R, G, and B). Subsequently, the map function 144(1) computes a 3×1 mean difference vector associated with the candidate 350(i) based on the following equation (3):

$$e^T = \frac{1}{|\bullet|}\sum S - \frac{1}{|\bullet|}\sum T \quad (3)$$

The map function 144(1) then computes the Mahalanobis distance (d) 360(i) based on the following equation (4):

$$d = \sqrt{\vec{e} \cdot C \cdot \vec{e}^T} \quad (4)$$

The map function 144(1) then compares the Mahalanobis distance 360(i) to the distance threshold 370. If the Mahalanobis distance 360(i) exceeds the distance threshold 370, then the map function 144(1) adds the candidate 350(i) to the refined candidate list 280(1). Otherwise, the map function 144(1) omits the candidate 350(i) from the refined candidate list 280(1).

In the example depicted in FIG. 3, the Mahalanobis distances 360(3), 360 (20), 360(21), 360(300), 360(525), and 360(932) exceed the empirically determined distance threshold 370 of 200. Consequently, the map function 144 (1) generates the refined candidate list 280(1) that includes the candidates 350(3), 350(20), 350(21), 350(300), 350 (525), and 350(932). The map function 144 may determine the distance threshold 370 in any technically feasible fashion.

Many modifications and variations on the functionality provided by the defective pixel detection application 140, including the map function 144, will be apparent to those of ordinary skill in the art without departing from the scope and spirit of the described embodiments. For instance, in alternative embodiments, the map function 144 may compute any type of statistical difference between any number of distributions of pixel intensity gradients to determine whether to re-classify a candidate as a non-defective pixel.

Figure 4:
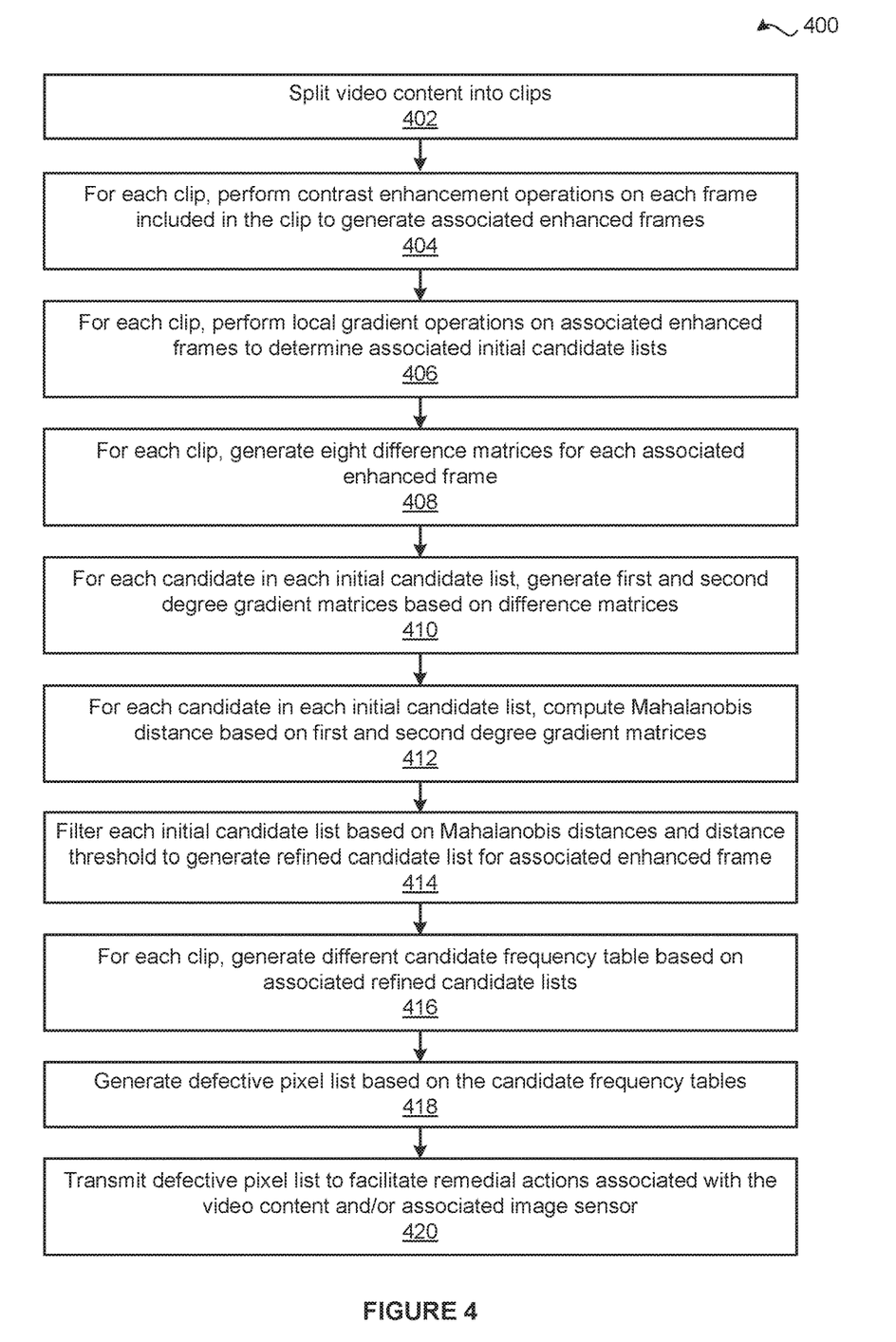
FIG. 4 is a flow diagram of method steps for detecting defective pixels in video content, according to various embodiments of the present invention.

FIG. 4 is a flow diagram of method steps for detecting defective pixels in video content, according to various embodiments of the present invention. Although the method steps are described with reference to the systems of FIGS. 1-3, persons skilled in the art will understand that any system configured to implement the method steps, in any order, falls within the scope of the present invention.

As shown, a method 400 begins at step 402, where the split function 142 partitions the video content 160 into the clips 170(1)-170(N). At step 404, for each of the clips 170(1)-170(N), the map function 144 performs the contrast enhancement operations 230 on the frames 210(1)-210(M) included in the clip 170 to generate the enhanced frames 240(1)-240(M) associated with the clip 170. At step 406, for each of the clips 170(1)-170(N), the map function 144 performs the local gradient operations 250 on the enhanced frames 240(1)-240(M) associated with the clip 170 to generate the initial candidate lists 260(1)-260(M) associated with the clip 170. Accordingly, as part of step 406, the map function 144 generates a total of N×M initial candidate lists 260, where each initial candidate list 260 is associated with a different enhanced frame 240. At step 408, for each of the clips 170(1)-170(N), the map function 144 generates eight different difference matrices 310(1)-310(8) for each of the associated enhanced frames 240(1)-240(M). In this fashion, the map function 144 generates a total of N×M×8 difference matrices 310, where each set of 8 difference matrices 310(1)-310(8) is associated with a different enhanced frame 240 and a different initial candidate list 260.

At step 410, for each candidate 350 included in each initial candidate list 260, the map function 144 generates a different first degree gradient matrix 330 and a different second degree gradient matrix 340 based on the associated difference matrices 310(1)-310(8). At step 412, for each candidate 350 included in each initial candidate list 260, the map function 144 computes a different Mahalanobis distance 360 based on the associated first degree gradient matrix 330 and the associated second degree gradient matrix 340. At step 414, the map function 144 filters each of the initial candidate lists 260 based on the associated Mahalanobis distances 360 and the distance threshold 370 to generate the corresponding refined candidate list 280.

At step 416, for each clip 170(i), the map function 144 performs the temporal consistency operations 292(i) based on the refined candidate lists 280(1)-280(M) associated with the clip 170(i) to generate the candidate frequency table 180(i). At step 418, the collect function 146 generates the defective pixel list 190 based on the candidate frequency tables 180(1)-180(N). At step 420, the collect function 146 transmits the defective pixel list 190 to any number and type of applications to facilitate remedial actions associated with the video content 160 and/or the image sensor(s) that acquired the defective pixels. The method 400 then terminates.

In sum, the disclosed techniques may be used to automatically and efficiently detect defective pixels in video content. In operation, a workflow subsystem provides a distributed execution framework for a defective pixel detection application. The defective pixel detection application includes, without limitation, a split function, a map function, and a collect function. In operation, the split function partitions the video content into clips of frames. For each of the clips, a different instance of the map function performs per-frame operations followed by temporal consistency operations to generate a different candidate frequency table.

More precisely, for a given frame, the map function implements an adaptive histogram equalization algorithm to generate an associated enhanced frame. In general, the adaptive histogram equalization algorithm selectively amplifies spatially local signals emanating from defective pixels. Subsequently, the map function executes Hessian and Harris corner detection algorithms on the enhanced frame to generate an initial candidate list of potentially defective pixels. For each candidate included in the initial candidate list, the map function then generates a first degree gradient matrix associated with a 3-by-3 neighborhood surrounding the candidate. The map function also generates a second degree gradient matrix associated with a 5-by-5 neighborhood surrounding the candidate. The map function then computes a Mahalanobis distance between the first degree gradient matrix and the second degree gradient matrix. If the Mahalanobis distance exceeds an empirically determined distance threshold, then the map function adds the candidate to a refined candidate list associated with the frame.

Subsequently, for each of the clips, the map function generates a different candidate frequency table based on the refined candidate lists for all the frames included in the clip and a temporal consistency criterion that specifies a minimum number of frames (F). More specifically, for each candidate, the map function sets the candidate frequency across the clip equal to the number of refined candidate lists in which the candidate appears. If the candidate frequency across the clip is greater than F, then the map function adds the candidate and the associated candidate frequency across the clip to the candidate frequency table. Otherwise, the map function omits the candidate from the candidate frequency table.

Finally, for each candidate included in the candidate frequency tables, the collect function computes an overall candidate frequency across the video content. The collect function then ranks the candidates based on the overall candidate frequencies and filters out any number of the ranked candidates based on a defect criterion. The collect function then generates a ranked defective pixel list that includes the remaining candidates and the associated overall candidate frequencies.

Advantageously, by automatically identifying defective pixels, the defective pixel detection application reduces both the time and amount of manual effort required to detect defective pixels in video content relative to prior art solutions. In particular, because the defective pixel detection application processes clips in a concurrent fashion, the defective pixel detection application efficiently processes the video content, irrespective of the total number of frames. Further, because the defective pixel detection application performs statistics-based spatial filtering as well as temporal consistency filtering on the initial candidate lists, the accuracy with which the defective pixel detection algorithm classifies pixels is increased relative to prior art solutions. These technical advantages provide one or more technological advancements over the prior art.

1. In some embodiments, a computer-implemented method comprises computing a first plurality of pixel intensity gradients based on a first frame of video content and a first neighborhood of pixels associated with a first pixel; computing a second plurality of pixel intensity gradients based on the first frame and a second neighborhood of pixels associated with the first pixel; computing a first statistical distance between the first plurality of pixel intensity gradients and the second plurality of pixel intensity gradients; and determining that the first pixel is defective based on the first statistical distance.

2. The computer-implemented method of clause 1, wherein the first statistical distance comprises a Mahalanobis distance.

3. The computer-implemented method of clauses 1 or 2, wherein computing the first statistical difference comprises calculating a mean difference vector based on the first plurality of pixel intensity gradients and the second plurality of pixel intensity gradients; generating a covariance matrix based on the second plurality of pixel intensity gradients; and calculating the first statistical difference based on the mean difference vector and the covariance matrix.

4. The computer-implemented method of any of clauses 1-3, wherein computing the first plurality of pixel intensity gradients comprises for each direction included in a plurality of directions, computing an offset matrix based on the first frame and the direction; for each offset matrix, computing a difference matrix based on the offset matrix and the first frame; and generating a first degree gradient matrix that includes the first plurality of pixel intensity gradients based on the difference matrices and a position associated with the first pixel.

5. The computer-implemented method of any of clauses 1-4, wherein the first plurality of pixel intensity gradients is included in a matrix of first degree pixel intensity gradients associated with the first neighborhood, and the second plurality of pixel intensity gradients is included in a matrix of second degree pixel intensity gradients associated with the second neighborhood.

6. The computer-implemented method of any of clauses 1-5, further comprising performing one or more patch-based histogram equalization operations on a source frame to generate the first frame.

7. The computer-implemented method of any of clauses 1-6, further comprising performing one or more corner detection operations on the first frame to determine that a second pixel included in the first frame is not defective.

8. The computer-implemented method of any of clauses 1-7, wherein determining that the first pixel is defective comprises computing a first overall candidate frequency associated with the first pixel based on a distance threshold and a plurality of statistical distances associated with the first pixel, wherein the plurality of statistical distances includes the first statistical distance; and performing a comparison operation between the first overall candidate frequency and a second overall candidate frequency that is associated with a second pixel.

9. The computer-implemented method of any of clauses 1-8, wherein determining that the first pixel is defective comprises determining that the first pixel is defective for a first intensity range based on the first statistical distance and a defect criterion; determining that the first pixel is defective for a second intensity range based on the defect criterion and a second statistical distance associated with both the first pixel and a second frame of the video content; and indicating that the first pixel is defective for multiple channels.

10. The computer-implemented method of any of clauses 1-9, further comprising causing one or more remedial actions to be performed on at least one of the video content and a sensor associated with the video content based on the defective pixel.

11. In some embodiments, one or more non-transitory computer readable media include instructions that, when executed by one or more processors, cause the one or more processors to perform the steps of computing a first distribution of first degree pixel intensity gradients associated with a first pixel based on a first frame of video content; computing a second distribution of second degree pixel intensity gradients associated with the first pixel based on the first frame; computing a first statistical distance between the first distribution and the second distribution; and determining that the first pixel is defective based on the first statistical distance.

12. The one or more non-transitory computer readable media of clause 11, wherein the first statistical distance comprises a Mahalanobis distance.

13. The one or more non-transitory computer readable media of clauses 11 or 12, wherein computing the first statistical difference comprises calculating a mean difference vector based on the first distribution and the second distribution; generating a covariance matrix based on the second distribution; and calculating the first statistical difference based on the mean difference vector and the covariance matrix.

14. The one or more non-transitory computer readable media of any of clauses 11-13, wherein computing the second distribution comprises for each direction included in a plurality of directions, computing an offset matrix based on the first frame and the direction; for each offset matrix, computing a difference matrix based on the offset matrix and the first frame; and generating a second degree gradient matrix based on the difference matrices and a position associated with the first pixel.

15. The one or more non-transitory computer readable media of any of clauses 11-14, wherein the first distribution is associated with a first neighborhood of pixels, and the second distribution is associated with a second neighborhood of pixels.

16. The one or more non-transitory computer readable media of any of clauses 11-15, further comprising performing one or more patch-based histogram equalization operations on a source frame to generate the first frame.

17. The one or more non-transitory computer readable media of any of clauses 11-16, further comprising, prior to computing the first distribution, performing one or more corner detection operations on the first frame to determine that the first pixel is potentially defective.

18. The one or more non-transitory computer readable media of any of clauses 11-17, wherein determining that the first pixel is defective comprises computing a first overall candidate frequency associated with the first pixel based on a distance threshold and a plurality of statistical distances associated with the first pixel, wherein the plurality of statistical distances includes the first statistical distance; and performing a comparison operation between the first overall candidate frequency and a frequency threshold.

19. The one or more non-transitory computer readable media of any of clauses 11-18, wherein determining that the first pixel is defective comprises determining that the first pixel is defective for a first intensity range based on the first statistical distance and a defect criterion; determining that the first pixel is defective for a second intensity range based on the defect criterion and a second statistical distance associated with both the first pixel and a second frame of the video content; and indicating that the first pixel is defective for multiple channels.

20. In some embodiments, a system comprises one or more memories storing instructions; and one or more processors that are coupled to the one or more memories and, when executing the instructions, are configured to compute a first plurality of pixel intensity gradients based on a first frame of video content and a first neighborhood of pixels associated with a first pixel; compute a second plurality of pixel intensity gradients based on the first frame and a second neighborhood of pixels associated with the first pixel, wherein the second neighborhood is larger than the first neighborhood; compute a first statistical distance between the first plurality of pixel intensity gradients and the second plurality of pixel intensity gradients; and determine that the first pixel is defective based on the first statistical distance.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
   computing a first plurality of pixel intensity gradients based on a first frame of video content and a first neighborhood of pixels associated with a first pixel;
   computing a second plurality of pixel intensity gradients based on the first frame and a second neighborhood of pixels associated with the first pixel;
   computing a first statistical distance between the first plurality of pixel intensity gradients and the second plurality of pixel intensity gradients, including:
      calculating a mean difference vector based on the first plurality of pixel intensity gradients and the second plurality of pixel intensity gradients,
      generating a covariance matrix based on the second plurality of pixel intensity gradients, and
      calculating the first statistical distance based on the mean difference vector and the covariance matrix; and
   determining that the first pixel is defective based on the first statistical distance.

2. The computer-implemented method of claim 1, wherein the first statistical distance comprises a Mahalanobis distance.

3. The computer-implemented method of claim 1, wherein computing the first plurality of pixel intensity gradients comprises:
   for each direction included in a plurality of directions, computing an offset matrix based on the first frame and the direction;
   for each offset matrix, computing a difference matrix based on the offset matrix and the first frame; and
   generating a first-degree gradient matrix that includes the first plurality of pixel intensity gradients based on (i) the difference matrices and (ii) a position associated with the first pixel.

4. The computer-implemented method of claim 1, wherein:
   the first plurality of pixel intensity gradients is included in a matrix of first-degree pixel intensity gradients associated with the first neighborhood, and
   the second plurality of pixel intensity gradients is included in a matrix of second-degree pixel intensity gradients associated with the second neighborhood.

5. The computer-implemented method of claim 1, further comprising performing one or more patch-based histogram equalization operations on a source frame to generate the first frame.

6. The computer-implemented method of claim 1, further comprising performing one or more corner detection operations on the first frame to determine that a second pixel included in the first frame is not defective.

7. The computer-implemented method of claim 1, wherein determining that the first pixel is defective comprises:
   computing a first overall candidate frequency associated with the first pixel based on a distance threshold and a plurality of statistical distances associated with the first pixel, wherein the plurality of statistical distances includes the first statistical distance; and
   performing a comparison operation between the first overall candidate frequency and a second overall candidate frequency that is associated with a second pixel.

8. The computer-implemented method of claim 1, wherein determining that the first pixel is defective comprises:
   determining that the first pixel is defective for a first intensity range based on the first statistical distance and a defect criterion;
   determining that the first pixel is defective for a second intensity range based on the defect criterion and a second statistical distance associated with both the first pixel and a second frame of the video content; and
   indicating that the first pixel is defective for multiple channels.

9. The computer-implemented method of claim 1, further comprising causing one or more remedial actions to be performed on at least one of the video content and a sensor associated with the video content based on the defective pixel.

10. One or more non-transitory computer readable media including instructions that, when executed by one or more processors, cause the one or more processors to perform the steps of:
   computing a first distribution of first-degree pixel intensity gradients associated with a first pixel based on a first frame of video content;
   computing a second distribution of second-degree pixel intensity gradients associated with the first pixel based on the first frame;

computing a first statistical distance between the first distribution of first-degree pixel intensity gradients and the second distribution of second-degree pixel intensity gradients, including:

calculating a mean difference vector based on the first distribution of first-degree pixel intensity gradients and the second distribution of second-degree pixel intensity gradients, generating a covariance matrix based on the second distribution of second-degree pixel intensity gradients, and calculating the first statistical distance based on the mean difference vector and the covariance matrix; and determining that the first pixel is defective based on the first statistical distance.

11. The one or more non-transitory computer readable media of claim 10, wherein the first statistical distance comprises a Mahalanobis distance.

12. The one or more non-transitory computer readable media of claim 10, wherein computing the second distribution comprises:

for each direction included in a plurality of directions, computing an offset matrix based on the first frame and the direction;

for each offset matrix, computing a difference matrix based on the offset matrix and the first frame; and generating a second-degree gradient matrix based on (i) the difference matrices and (ii) a position associated with the first pixel.

13. The one or more non-transitory computer readable media of claim 10, wherein the first distribution is associated with a first neighborhood of pixels, and the second distribution is associated with a second neighborhood of pixels.

14. The one or more non-transitory computer readable media of claim 10, further comprising performing one or more patch-based histogram equalization operations on a source frame to generate the first frame.

15. The one or more non-transitory computer readable media of claim 10, further comprising, prior to computing the first distribution, performing one or more corner detection operations on the first frame to determine that the first pixel is potentially defective.

16. The one or more non-transitory computer readable media of claim 10, wherein determining that the first pixel is defective comprises:

computing a first overall candidate frequency associated with the first pixel based on a distance threshold and a plurality of statistical distances associated with the first pixel, wherein the plurality of statistical distances includes the first statistical distance; and performing a comparison operation between the first overall candidate frequency and a frequency threshold.

17. The one or more non-transitory computer readable media of claim 10, wherein determining that the first pixel is defective comprises:

determining that the first pixel is defective for a first intensity range based on the first statistical distance and a defect criterion;

determining that the first pixel is defective for a second intensity range based on the defect criterion and a second statistical distance associated with both the first pixel and a second frame of the video content; and indicating that the first pixel is defective for multiple channels.

18. A system, comprising:

one or more memories storing instructions; and one or more processors that are coupled to the one or more memories and execute the instructions to:

compute a first plurality of pixel intensity gradients based on a first frame of video content and a first neighborhood of pixels associated with a first pixel;

compute a second plurality of pixel intensity gradients based on the first frame and a second neighborhood of pixels associated with the first pixel, wherein the second neighborhood is larger than the first neighborhood;

compute a first statistical distance between the first plurality of pixel intensity gradients and the second plurality of pixel intensity gradients, including instructions to:

calculate a mean difference vector based on the first plurality of pixel intensity gradients and the second plurality of pixel intensity gradients, generate a covariance matrix based on the second plurality of pixel intensity gradients, and calculate the first statistical distance based on the mean difference vector and the covariance matrix; and determine that the first pixel is defective based on the first statistical distance.

19. The system of claim 18, wherein the one or more processors execute the instructions to determine that the first pixel is defective by:

computing a first overall candidate frequency associated with the first pixel based on a distance threshold and a plurality of statistical distances associated with the first pixel, wherein the plurality of statistical distances includes the first statistical distance; and performing a comparison operation between the first overall candidate frequency and a second overall candidate frequency that is associated with a second pixel.

20. The system of claim 18, wherein the one or more processors execute the instructions to determine that the first pixel is defective by:

determining that the first pixel is defective for a first intensity range based on the first statistical distance and a defect criterion;

determining that the first pixel is defective for a second intensity range based on the defect criterion and a second statistical distance associated with both the first pixel and a second frame of the video content; and indicating that the first pixel is defective for multiple channels.

* * * * *